Patented Oct. 19, 1948

2,451,637

UNITED STATES PATENT OFFICE 2,451,637

N(β-HYDROXY ETHYL)-TETRAIODO-PHTHALIMIDE

William H. Strain, Rochester, N. Y., and Joseph Dec, Martinsville, N. J., assignors to Eastman Kodak Company, Rochester, N. Y., a corporation of New Jersey No Drawing. Application February 1, 1947, Serial No. 725,966

1 Claim. (Cl. 260—326)

This invention relates to a new compound, N-(β-hydroxyethyl)-tetraiodophthalimide or β-tetraiodophthalimido-ethanol,

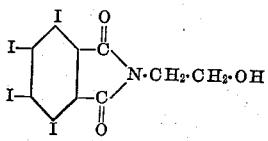

This compound has high radiographic opacity and low toxicity, and has been found to be useful as a contrast medium for the roentgenographic visualization of the gastro-intestinal tract. The standard barium sulfate suspensions which are now used clinically for gastro-intestinal studies usually settle out, are gritty, adhere only moderately well to the bowel wall, and frequently inspissate in the bowel. On the other hand, a 25% aqueous suspension of N-(β-hydroxyethyl)-tetraiodophthalimide milled to substantially colloidal size does not settle, is not gritty, adheres well to the mucosal surface of the bowel, thus outlining the fine structure, and apparently does not inspissate appreciably in the bowel.

A 25% aqueous suspension of finely ground tetraiodophthalimide, the parent compound, was first used clinically with a number of patients. It was administered orally on a fasting stomach, and the amount of suspension given each patient was of the order of 100-200 cc. The usual fluoroscopic examination was made during and following the administration. Although the patients tolerated the mixture well, it was found that the contraction waves of the stomach were increased markedly. Although this may be desirable in certain types of cases, routine use would involve revision of the standards used for stomach work, and this would be a task of great magnitude.

However, a 25% aqueous suspension of finely ground N-(β-hydroxyethyl)-tetraiodophthalimide, and also suspensions of different particle size and concentration, have been used for a very considerable number of clinical examinations. At no time have any untoward reactions been observed. Furthermore, there has been no evidence fluoroscopically that the suspensions of N-(β-hydroxyethyl)-tetraiodophthalimide alter the normal stomach motility; this indicates that the medium is devoid of irritating effects.

We give below two examples showing methods of making our novel compound.

*Example 1.*—To a solution of 652 g. of tetraiodophthalimide in 2000 ml. of nitrobenzene at 150° C. is added 415 g. of N-(β-hydroxyethyl)-formamide, and the mixture is stirred at 155° C. for one hour. On cooling to room temperature, solid N-(β-hydroxyethyl)-tetraiodophthalimide separates and is isolated by filtering and washing with hot methanol. The product is purified by crystallization from dioxane and is obtained in the form of beautiful yellow crystals melting at 275–280° C. The preparation of tetraiodophthalimide is described by Pratt and Perkins in J. Am. Chem. Soc. 40, 212 (1918). The preparation of N-(β-hydroxyethyl)-formamide is described by Wenker in J. Am. Chem. Soc. 57, 1079 (1935).

*Example 2.*—A mixture of 326 parts of tetraiodophthalic anhydride and 830 parts of N-(β-hydroxyethyl)-formamide is heated with stirring for one hour at 155–160° C. On cooling, N-(β-hydroxyethyl)-tetraiodophthalimide separates and is isolated by filtration. For purification, the product is slurried in water, filtered, and washed well first with water and finally with alcohol. The preparation of tetraiodophthalic anhydride is described by Pratt and Shupp in J. Am. Chem. Soc. 40, 254 (1918).

N-(β-hydroxyethyl)-tetraiodophthalimide as obtained by our syntheses consisted of needles varying in particle size from 3 to 25 microns. Suspensions suitable for clinical use, with a particle size of 1–2 microns, were prepared from this material, either by wet ball-milling with water for 10–12 weeks or by dry grinding in a "Micronizer" pulverizer, manufactured by the International Pulverizer Co., of Moorestown, N. J., and then wet ball-milling for 2–3 weeks the product thus dry-ground. The ball-milling was done in a 1-gallon apparatus using charges of about 2 kilograms of which usually 25 per cent was N-(β-hydroxyethyl)-tetraiodophthalimide and the rest water. Periods of ball-milling shorter than those specified were inadequate to reduce the particle size uniformly to 1.5–2 microns.

Other methods of reducing the particle size may occur to those skilled in the art.

The results of animal and clinical testing of our novel compound as a contrast medium for roentgenographic visualization of the gastro-intestinal tract are described in a paper by Jones, Chalecke, Dec, Schilling, Ramsey, Robertson and Strain, presented December 5, 1946, in Chicago, Illinois, before the 32nd annual meeting of the Radiological Society of North America, and published in Radiology 49, 143–151 (1947).

What we claim as our invention and desire to be secured by Letters Patent of the United States is:

N-(β-hydroxyethyl)-tetraiodo-phthalimide, having the formula

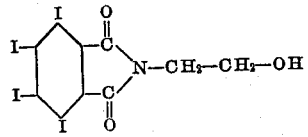

WILLIAM H. STRAIN.
JOSEPH DEC.

REFERENCES CITED

The following references are of record in the file of this patent:

Allen et al., Jour. Am. Chem. Soc., vol. 56, pages 1409, 1410 (1934).

Schulze, Manufacturing Chemist (January 1935), pages 5 to 7.

Hefke, Jour. Am. Medical Assn. (June 10, 1944), vol. 125, page 455.